(12) United States Patent
Kroyer et al.

(10) Patent No.: US 11,181,340 B2
(45) Date of Patent: Nov. 23, 2021

(54) MISSILE LAUNCHING SYSTEM FOR LAUNCHING MISSILES FROM A MOBILE PLATFORM

(71) Applicant: MBDA Deutschland GmbH, Schrobenhausen (DE)

(72) Inventors: Robert Kroyer, Munich (DE); Herbert Ertl, Poecking (DE)

(73) Assignee: MBDA Deutschland GmbH, Schrobenhausen (DE)

(*) Notice: Subject to any disclaimer, the term of this patent is extended or adjusted under 35 U.S.C. 154(b) by 0 days.

(21) Appl. No.: 17/083,627

(22) Filed: Oct. 29, 2020

(65) Prior Publication Data

US 2021/0131762 A1    May 6, 2021

(30) Foreign Application Priority Data

Oct. 30, 2019  (DE) .......................... 102019007554.4

(51) Int. Cl.
*F41F 3/065*  (2006.01)
*F41F 3/052*  (2006.01)

(52) U.S. Cl.
CPC .............. *F41F 3/065* (2013.01); *F41F 3/052* (2013.01)

(58) Field of Classification Search
CPC .. F41F 3/065; F41F 3/052; F41F 3/055; F41F 3/042
See application file for complete search history.

(56) References Cited

U.S. PATENT DOCUMENTS

| | | |
|---|---|---|
| 3,750,530 A | 8/1973 | Cords |
| 3,766,828 A | 10/1973 | Cords |
| 3,766,829 A | 10/1973 | Cords |

(Continued)

FOREIGN PATENT DOCUMENTS

| | | |
|---|---|---|
| DE | 2055486 A | 6/1971 |
| DE | 2055486 A1 | 6/1971 |

(Continued)

OTHER PUBLICATIONS

German Search Report dated Jul. 29, 2020 issued in corresponding DE 102019007554.4 application (6 pages).

(Continued)

*Primary Examiner* — J. Woodrow Eldred
(74) *Attorney, Agent, or Firm* — Millen, White, Zelano & Branigan, P.C.; William Nixon

(57) ABSTRACT

A missile launching system for launching missiles from a mobile platform includes a rectangular primary carrier frame having a platform coupling structure for releasably fastening the first carrier frame to the mobile platform, and a launch tube. A locking device on the primary carrier frame includes a lock hook which projects from the primary carrier frame and has a receiving piece. A stop piece extends transverse to the receiving piece. A locking plate is inserted between the receiving piece and the stop piece. The launch tube has a fastening bracket with a fastening recess fitted onto the receiving piece and locked with the lock hook by inserting the locking plate between the stop piece and the receiving piece. Alternatively, two launch tube receiving devices are laterally attached to the primary carrier frame, each of which is designed as a closed frame defining a receiving opening.

13 Claims, 6 Drawing Sheets

(56) References Cited

U.S. PATENT DOCUMENTS

| | | | | |
|---|---|---|---|---|
| 6,125,734 | A * | 10/2000 | Yagla | F41F 3/042 89/1.8 |
| 2002/0189432 | A1 * | 12/2002 | Facciano | F41F 3/042 89/1.801 |
| 2006/0086241 | A1 * | 4/2006 | Miller | F41B 11/00 89/1.802 |
| 2010/0236391 | A1 | 9/2010 | Baldi et al. | |
| 2019/0353453 | A1 * | 11/2019 | Bittner | F41F 3/042 |
| 2020/0386515 | A1 * | 12/2020 | Cantine | F41G 7/346 |

FOREIGN PATENT DOCUMENTS

| | | |
|---|---|---|
| KR | 1020190079318 A | 7/2019 |
| RU | 2539434 C1 | 1/2015 |

OTHER PUBLICATIONS

Search report in corresponding EP20196369 dated Feb. 23, 2021 (pp. 1-7).

* cited by examiner

MISSILE LAUNCHING SYSTEM FOR LAUNCHING MISSILES FROM A MOBILE PLATFORM

The present invention relates to a missile launching system for launching missiles from a mobile platform, for example from an aircraft.

Firing or launching systems are typically used to propel missiles or rockets from a mobile platform, for example from a helicopter, an aeroplane or an aircraft in general. Such launching systems generally have a carrier device which is coupled to the mobile platform and to which one or more launch tubes are fastened, from which the missiles are launched. Particularly when such launching systems are intended for use on an aircraft, high demands are placed on the inertial behaviour and oscillation behaviour, and the mass. In particular, it is desirable for the launching system to also fulfil a predefined oscillation requirement when one or more missiles have already been launched and the mass of the system thus changes. It is also desirable for the launching system to be able to be loaded with missiles in a simple and safe manner.

In order to meet these requirements, missile launching systems are usually designed and constructed individually for a given mobile platform, with a fixed number of launch tubes typically being provided. U.S. Pat. No. 3,766,828 A describes a modular launching system which has an upper launching module with a first carrier device for holding two launch tubes, and a lower launching module with a second carrier device for holding a further two launch tubes. The lower carrier module and the upper carrier module can be coupled to each other via eyelets. The carrier devices each have receiving frames projecting laterally therefrom with a vertically pivotable locking strut, it being possible to insert the launch tubes laterally into each receiving frame when the locking strut is pivoted into an open position.

One of the objects of the present invention is to provide an improved launching system. In particular, an object of the invention is to improve a launching system in such a way that the launch tubes can be attached to a carrier frame of the launching system in a simple and mechanically stable manner.

This object is achieved by the subject matter of the independent claims.

Advantageous configurations and developments can be found in the dependent claims, which refer back to the independent claims, in conjunction with the description.

According to a first aspect of the invention, a missile launching system for launching missiles from a mobile platform is provided. The launching system comprises a rectangular primary carrier frame extending in a longitudinal direction, with at least one platform coupling structure for releasably fastening the first carrier frame to the mobile platform, and with at least one locking device, which has a lock hook that projects from the primary carrier frame and has a receiving piece which extends in the longitudinal direction, a stop piece extending transverse to the receiving piece, and a locking plate which can be inserted with respect to the between the receiving piece and the stop piece. The launching system further comprises at least one launch tube with at least one fastening bracket connected to a launch tube wall, which bracket has a fastening recess configured to correspond to the receiving piece of the lock hook of the locking device. The fastening bracket of the launch tube with the fastening recess can be fitted in the longitudinal direction to the receiving piece of the lock hook of the locking device, and can be locked with the lock hook by inserting the locking plate between the stop piece and the receiving piece.

This aspect of the invention is based on the idea of locking a launch tube to a carrier frame using at least one locking device, wherein a bracket with a fastening recess extending in a longitudinal direction of the launch tube is attached to the launch tube, and the locking device fastened to the carrier frame has a hook which projects from the carrier frame and which has a receiving piece that extends in the longitudinal direction and has the same cross-sectional shape as the fastening recess. The locking device also comprises a, for example, planar stop piece which also projects from the carrier frame and which is arranged spaced apart from the receiving piece in the longitudinal direction, such that a locking gap is formed between the stop piece and the receiving piece. To attach the launch tube to the carrier frame, which can be designed, for example, as a closed rectangular frame, from which optionally one or more transverse beams protrude in a transverse direction, the launch tube is positioned on the carrier frame and the bracket is inserted into the locking gap such that the fastening recess of the bracket and the receiving piece of the lock hook are opposite each other and/or are aligned with each other in the longitudinal direction. From this position, the fastening recess of the bracket can be pushed onto or fitted to the receiving piece of the lock hook in the longitudinal direction, such that the receiving piece projects into the fastening recess. To lock the bracket with the lock hook, a locking plate is inserted into the locking gap, filling the locking gap. As a result, the bracket is fixed with respect to the longitudinal direction, in particular in a form-fitting manner.

One advantage of attaching the launch tube to the carrier frame via the described locking device is that the launch tube can be easily installed by pushing the bracket onto the receiving piece of the lock hook. In particular, an easily releasable fastening option is achieved, which makes it easier to replace a launch tube after use; that is to say, after a missile has been fired from the launch tube. Since the receiving piece and the fastening recess of the bracket are also implemented with mutually corresponding cross-sectional shapes, in particular with corresponding dimensions, play between the fastening recess and the receiving piece is advantageously reduced, which improves the vibration resistance.

According to one embodiment, the receiving piece of the lock hook of the locking device and the fastening recess can have a non-circular cross section, in particular a rectangular cross section. The non-circular cross section, i.e. for example a polygonal cross section or an oval or elliptical cross section, prevents unwanted rotation of the bracket relative to the lock hook about an axis which extends in the longitudinal direction. This further improves the vibration resistance.

According to a further embodiment, the primary carrier frame can have a first locking device and a second locking device, which is arranged spaced apart from the first locking device with respect to the longitudinal direction, wherein the first locking device has a lock hook projecting from the primary carrier frame, which hook has a receiving piece extending in the longitudinal direction, a stop piece extending transverse to the receiving piece, and a locking plate which can be inserted between the receiving piece and the stop piece with respect to the longitudinal direction, wherein the second locking device has a lock hook which projects from the primary carrier frame and which has a receiving piece which extends in the longitudinal direction, a stop piece extending transverse to the receiving piece, and a locking plate which can be inserted between the receiving piece and the stop piece with respect to the longitudinal direction, wherein the launch tube has a first fastening bracket, and a second fastening bracket arranged relative to the first fastening bracket with respect to the longitudinal direction, wherein the first fastening bracket has a fastening recess designed to correspond to the receiving piece of the lock hook of the first locking device, wherein the second fastening bracket has a fastening recess designed to correspond to the receiving piece of the lock hook of the second locking device, wherein the first fastening bracket, by means of its fastening recess, can be fitted in the longitudinal direction to the receiving piece of the lock hook of the first locking device and can be locked with the lock hook of the first locking device by inserting the locking plate of the first locking device between the stop piece and the receiving piece of the first locking device, and wherein the second fastening bracket, by means of its fastening recess, can be fitted in the longitudinal direction to the receiving piece of the lock hook of the second locking device and can be locked with the lock hook of the second locking device by the insertion of the locking plate of the second locking device between the stop piece of the second locking device and the receiving piece of the second locking device. Accordingly, the launch tube can be locked to the primary carrier frame at two points spaced apart along the longitudinal direction. The spaced locking devices of the primary carrier frame, like the corresponding fastening brackets of the launch tube, can be constructed identically. A simple structural design is thus achieved. In addition, by fastening the launch tube at two points that are spaced apart from each other, the vibration resistance of the launch tube is further improved. As a result, given the rigidity of the launch tube, the launch tube wall can be made thinner, which also results in a weight advantage.

According to a further embodiment, the stop piece and the locking plate of the at least one locking device can each have a passage, wherein the passage of the stop piece and the passage of the locking plate are arranged coaxially with each other when the locking plate is inserted between the stop piece and the receiving piece, and wherein the locking device has a locking bolt which can be passed through the passage of the stop piece and the passage of the locking plate. The locking bolt prevents the locking plate from accidentally falling out of the locking gap. This further improves the safety and/or reliability of the locking device.

According to a further embodiment, the launch tube wall of the launch tube can form a depression in which the fastening bracket is arranged. The depression can, for example, have a rectangular shape. Optionally, the fastening bracket can be arranged in the depression in such a way that a surface of the fastening bracket is arranged so as to be aligned with a region of a surface of the launch tube wall surrounding the depression. By arranging the fastening bracket in the depression, a particularly compact structure is achieved, which facilitates positioning of the launch tube close to the primary carrier frame, while at the same time being easy to assemble.

According to a second aspect of the invention, a missile launching system for launching missiles from a mobile platform is provided. The missile launching system according to this aspect of the invention comprises a rectangular primary carrier frame which extends in the longitudinal direction and has at least one platform coupling structure for releasably fastening the first carrier frame to the mobile platform, a first launch tube receiving device which is laterally fastened to the primary carrier frame and which is designed as a closed, first frame defining a first receiving opening, a second launch tube receiving device which is laterally fastened to the primary carrier frame, is spaced apart from the first launch tube with respect to the longitudinal direction and is designed as a closed second frame defining a second receiving opening, a launch tube which has an outer circumference corresponding to the receiving openings of the launch tube receiving devices and can be inserted in the longitudinal direction into the first and the second receiving opening, and at least one connecting bolt per launch tube receiving device by means of which the launch tube can be attached to the launch tube receiving device in each case.

The idea on which this aspect of the invention is based is that of providing, for the purpose of a simple and mechanically robust attachment of launch tubes to a primary carrier frame extending in a longitudinal direction, frames or receiving frames as launch tube receiving devices on the primary carrier frame, laterally projecting from it, each defining a recess or opening, e.g. a rectangular or circular recess, such that the launch tube can be pushed into these recesses in the longitudinal direction and, in a pushed-in state in which the launch tube projects through both recesses in the longitudinal direction, can be connected to the receiving frame—for example, releasably connected. The receiving openings of the launch tube receiving devices defined by the frames can in particular be arranged coaxially with each other. In particular, the centre axes of the receiving openings of the launch tube receiving devices can extend in the longitudinal direction and be arranged coaxially with each other.

One of the advantages of the system according to this aspect of the invention is that, due to the design of the launch tube receiving devices in the form of closed frames, the launch tube in the pushed-in state is completely encompassed on its entire outer circumference and on an outer surface of a launch tube wall. This stabilizes the launch tube very well, for example against oscillations or vibrations. This makes it easier to meet requirements for vibration resistance both when a missile is received in the launch tube and when the missile has already been launched and/or fired. Furthermore, the launch tube can be installed on the carrier frame in a particularly simple manner by simply pushing the launch tube in the longitudinal direction into the receiving recesses. Another advantage of the launch tube receiving devices designed as frames is that they form a mounting surface for fastening the launch tubes, for example by means of the connecting bolts. The connecting bolts can, for example, each protrude into an opening formed in the launch tube wall and also into an opening formed in each of the receiving frames.

According to one embodiment of the missile launching system according to the second aspect of the invention, the connecting bolts can be implemented as screws. For example, a plurality of first connection openings can be formed on the receiving frames, through each of which openings a screw can be screwed into a screw hole of the launch tube wall, which hole is provided with an internal thread. This further facilitates the ability of the launch tube to be installed on the primary carrier frame.

According to a further embodiment of the missile launching system according to the second aspect of the invention, the launch tube receiving devices can each be screwed to the primary carrier frame. For example, a plurality of second connection openings can be formed on each of the receiving frames, through each of which openings a screw can be screwed into a screw hole of the carrier frame, which hole is provided with an internal thread. A releasable connection between the primary carrier frame and the receiving frame of the launch tube receiving devices is thus advantageously achieved.

According to a further embodiment of the missile launching system according to the second aspect of the invention, the launch tube receiving devices can each extend in the longitudinal direction. This means that the receiving frames of the launch tube receiving devices each have a certain extension along the longitudinal direction. Planar contact between the launch tube and the receiving frame is thus achieved, as a result of which the launch tube is protected against bending along the longitudinal direction in a further improved manner. In particular, the launch tube receiving devices and/or the receiving frames of the launch tube receiving devices can each have a longitudinal extension in the longitudinal direction which is in a range between 4 percent and 10 percent of a total length of the launch tube. In this range, it has been found that there is particularly good vibration damping for a large number of dimensions. In particular, a thickness of the launch tube wall can be reduced, which also results in a weight advantage.

According to the first and the second aspects of the invention, embodiments can be provided according to which the primary carrier frame has: a first longitudinal beam which extends in the longitudinal direction, on which the at least one platform coupling structure is formed; and a second longitudinal beam extending along the longitudinal direction, which is arranged spaced apart from the first longitudinal beam in a vertical direction running transverse to the longitudinal direction and which has a first connecting structure on an underside oriented away from the first longitudinal beam, the first connecting structure defining a first plug connection portion which extends in the longitudinal direction and to which a second carrier frame having a second plug connection portion designed so as to be complementary to the first plug connection portion can be attached in the vertical direction, and which has at least two first through-bores spaced apart in the longitudinal direction, through which bores connecting devices can be passed to fix the primary carrier frame and the second carrier frame to each other when the second carrier frame is fitted to the primary carrier frame.

Accordingly, a connecting structure on an underside or a lower end of the primary carrier frame can be designed as a plug connector which extends in the longitudinal direction or as a socket which extends in the longitudinal direction. In general, the connecting structure of the first carrier frame thus defines a first plug connection portion. A further, second carrier frame, which on its top side has a second connecting structure with a second plug connection portion which is complementary to the first plug connection portion, can thus be fitted in the vertical direction to the first plug connection portion of the first carrier frame. According to the invention, the connecting structure has at least two first through-bores spaced apart in the longitudinal direction. These can extend, for example, through the first plug connection portion, such that a bolt, a screw, a rivet or a connecting device in general can be passed through the first through-bores and through correspondingly formed through-bores on the second connecting structure of the second carrier frame, in order to fix the first and the second carrier frames to each other. The elongated design of the first plug connection portion provides a possibility of form-fittingly fixing a further carrier frame, with respect to a transverse direction extending transverse to the vertical direction and to the longitudinal direction. Due to the elongated design, the transmission of force between the primary carrier frame and a second carrier frame fitted thereto is advantageously distributed along the longitudinal direction. As a result, a very rigid frame arrangement can be formed from the primary carrier frame and an optional second carrier frame, such that the number of launch tubes can be varied in a simple manner.

The first plug connection portion can optionally be formed by a recess formed on the underside of the second longitudinal beam or by a lug arrangement projecting in the vertical direction from the underside of the second longitudinal beam. For example, the second longitudinal beam can be designed as a hollow profile open on the underside, with two opposing profile side walls which extend in the longitudinal direction, the profile side walls defining the longitudinally extending recess that forms the first plug connection portion. In this case, the first through-holes can be formed in particular in the profile side walls and/or in a profile ceiling wall connecting the profile side walls. This simplifies the weight and the structural design of the plug connection device. The lug arrangement can, for example, have a lug which extends continuously in the longitudinal direction and which projects from the underside of the second longitudinal beam. The lug arrangement can, for example, have two lugs spaced apart in the transverse direction. It is conceivable, for example, for these to be formed by the profile side walls. It is also conceivable for the lug arrangement to have a plurality of—in general at least two—lugs which are spaced apart in the longitudinal direction, thereby advantageously further reducing the weight of the lug arrangement.

The primary carrier frame can furthermore have a first connecting beam which connects the first and second longitudinal beams, and a second connecting beam which is spaced apart from the first longitudinal beam with respect to the longitudinal direction and which connects the first and second longitudinal beams. Also optionally, in a further embodiment, the primary carrier frame can have at least one first transverse beam extending transverse to the longitudinal beams. The at least one transverse beam extends along the transverse direction. For example, the at least one transverse beam can have a first transverse beam portion which extends on a first side of the longitudinal beams with respect to the transverse direction, and a second transverse beam portion which extends on a second side of the longitudinal beams with respect to the transverse direction. In general, at least one transverse beam is provided. For example, the first carrier frame can have a front transverse beam, and a rear transverse beam arranged spaced apart therefrom with respect to the longitudinal direction. The at least one transverse beam advantageously provides an additional mounting surface.

According to a further embodiment, the launching system can comprise at least two connecting devices and a rectangular, second carrier frame, which has: a third longitudinal beam extending in a longitudinal direction, which has a second connecting structure on a top side, wherein the second connecting structure defines a second plug connection portion which extends in the longitudinal direction, which is complementary to the first plug connection portion, and which can be attached to the first plug connection portion in the vertical direction, as well as at least two second through-bores which are arranged in the longitudinal direction so as to correspond to the first through-bores, wherein the connecting devices can each pass through the first and second through-bores in order to fix the primary carrier frame and the second carrier frame to each other when the second carrier frame is fitted to the primary carrier frame. The second carrier frame is thus of substantially the same construction as the first carrier frame, and has a second plug connection portion on a top side of its longitudinal beam, which portion can be attached to the first plug connection portion. The second plug connection portion is designed to be complementary to the first plug connection portion. Consequently, the second plug connection portion is designed as a plug connector if the first plug connection portion is designed as a socket, and is designed as a socket if the first plug connection portion is designed as a plug connector. When the second plug connection portion of the second carrier frame is fitted to the first plug connection portion of the primary carrier frame, the through-holes of both plug connection portions are aligned and the connecting devices, e.g. bolts, screws, rivets or the like, can be inserted into the through-bores. In this way, as already described above, a structurally simple, vibration-resistant, and highly mechanically robust connection is provided between the carrier frames. Due to the releasable coupling of the first and second carrier frames to each other, the launching system can also be flexibly converted—for example, to modify the launch tube load of the system.

Optionally, the second plug connection portion can be formed by a lug arrangement projecting in the vertical direction from the top side of the third longitudinal beam, or by a recess formed on the top side of the third longitudinal beam.

The second carrier frame can optionally have a fourth longitudinal beam which is arranged spaced apart from the third longitudinal beam in the vertical direction. Furthermore, the second carrier frame can have a third connecting beam which connects the third and fourth longitudinal beams, and a fourth connecting beam which is spaced apart from the third longitudinal beam with respect to the longitudinal direction and which connects the third and fourth longitudinal beams. A rectangular, closed frame is thus formed which, relative to its weight, has high mechanical rigidity. The connecting beams can extend, for example, substantially perpendicular or generally transverse to the longitudinal beams. Alternatively or additionally, the second carrier frame can also have at least one second transverse beam, as was described above for the primary carrier frame. The at least one second transverse beam can, for example, be formed as a single piece together with the third or fourth longitudinal beam. Furthermore, the at least one second transverse beam can be arranged, for example, in the region of the third longitudinal beam in terms of the vertical direction.

According to the first aspect of the invention, one or more locking devices can be provided both on the primary carrier frame and on the second carrier frame. In particular, a locking device can be arranged on each carrier frame, on one or more of the beams, consisting of the following group of beams: longitudinal beams, connecting beams, stiffening beams, transverse beams.

According to the second aspect of the invention, at least two launch tube receiving devices can be provided, both on the primary carrier frame and on the second carrier frame. In particular, the launch tube receiving devices on each carrier frame can be fastened to one or more of the beams, consisting of the following group of beams—for example, bolted thereto: longitudinal beams, connecting beams, stiffening beams, transverse beams.

With regard to directional indications and axes, in particular directional indications and axes that relate to the profile of physical structures, a profile of an axis, of a direction or of a structure "along" another axis, direction or structure is understood here to mean that these tangents—in particular, the tangents at a given point of the structures—each run at an angle of less than 45 degrees, preferably less than 30 degrees, and particularly preferably run parallel to each other.

With regard to directional indications and axes, in particular directional indications and axes that relate to the profile of physical structures, a profile of an axis, of a direction or of a structure "transverse" to another axis, direction or structure is understood here to mean that these tangents—in particular, the tangents at a given point of the structures—each run at an angle of greater than or equal to 45 degrees, preferably greater than or equal to 60 degrees, and particularly preferably run perpendicular to each other.

The invention is explained below with reference to the figures of the drawings, in which.

In the figures, the same reference signs denote the same or functionally identical components, unless stated otherwise.

Figure 7:
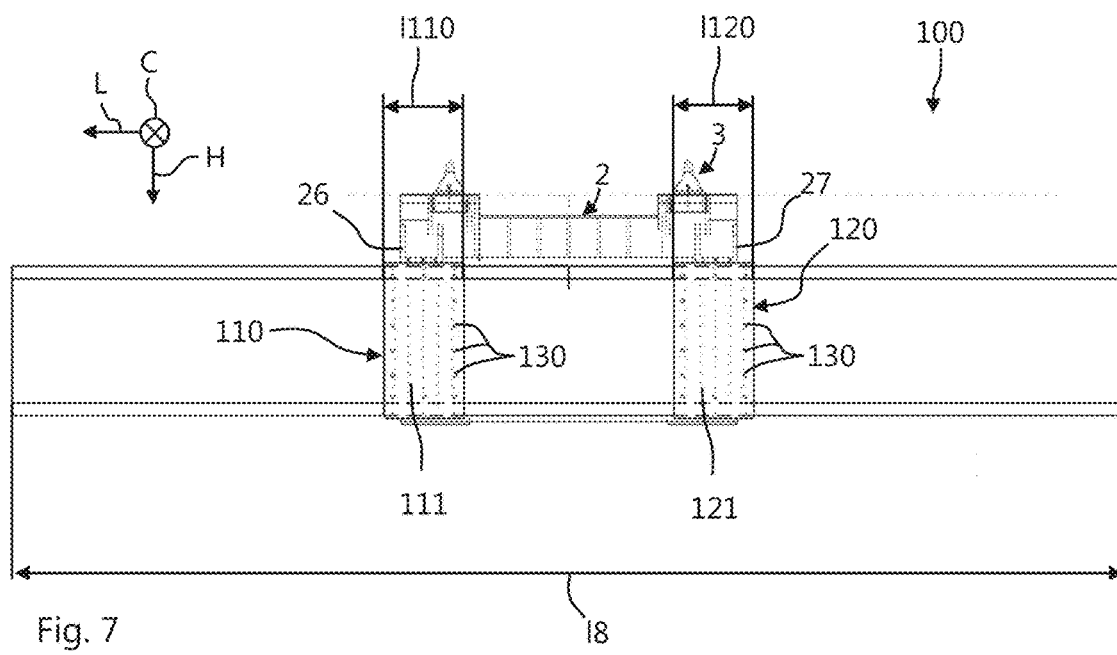
FIG. 7 is a side view of a missile launching system according to a further embodiment of the invention.
Figure 8:
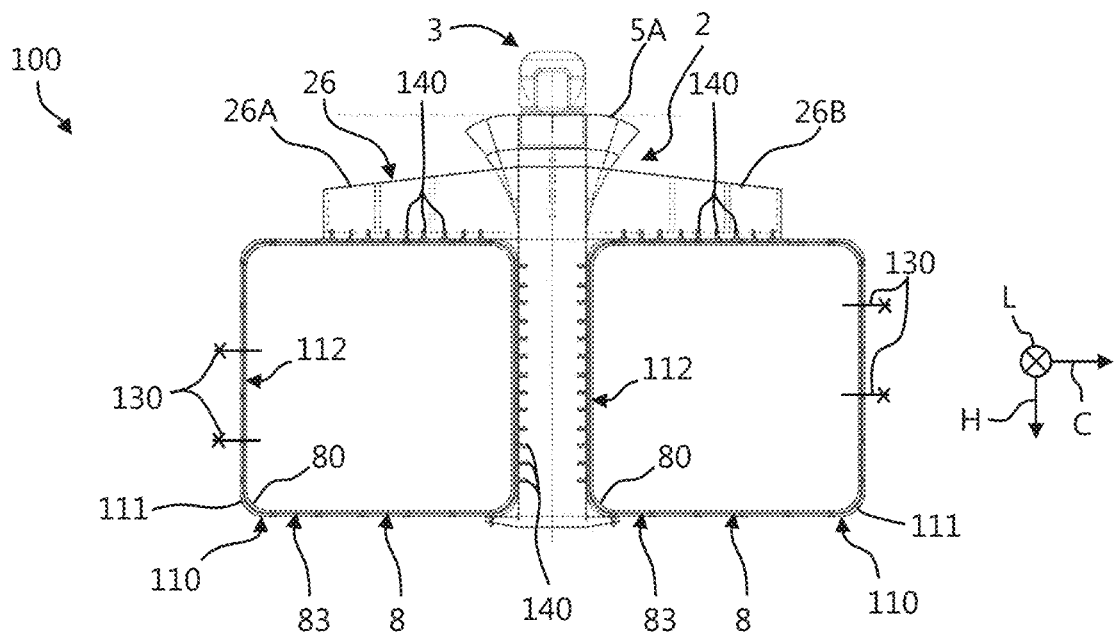
FIG. 8 is a sectional view of the missile launching system shown in FIG. 7.
Figure 9:
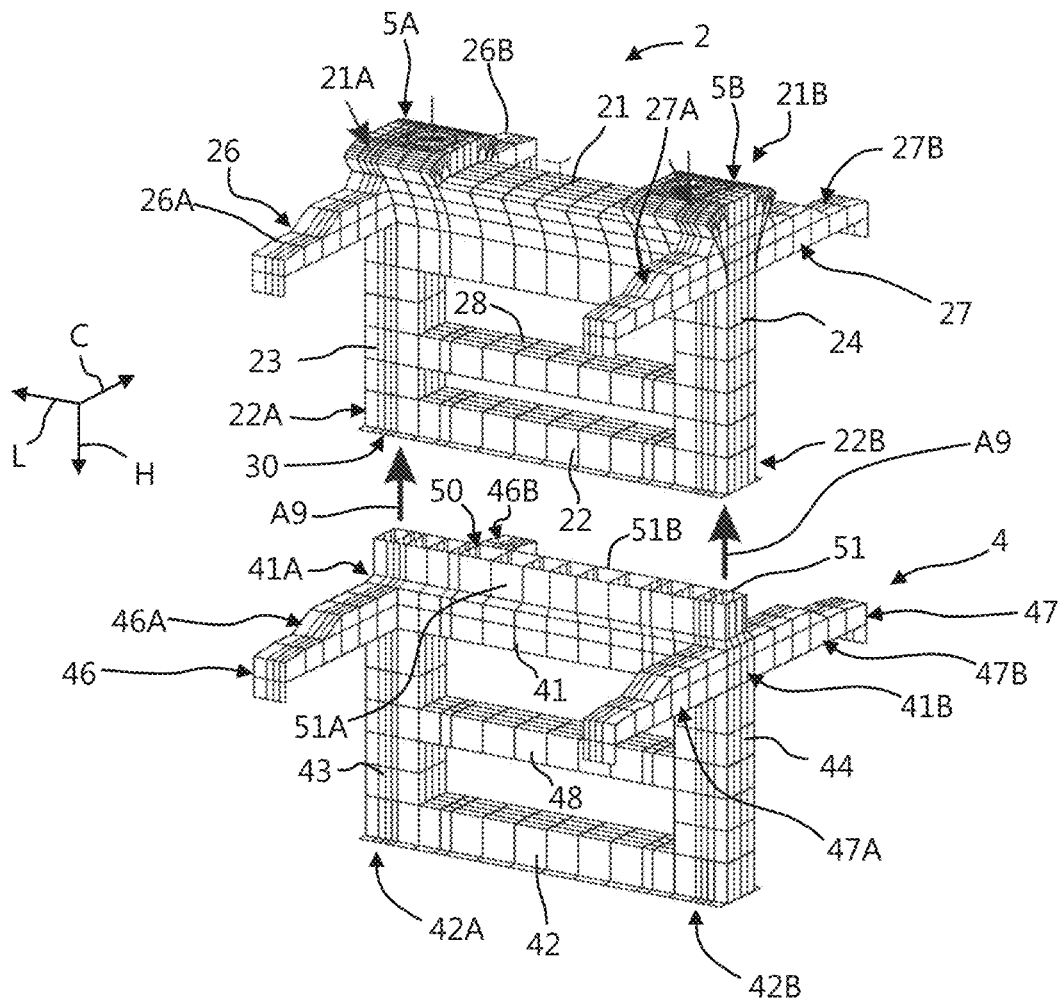
FIG. 9 is a perspective exploded view of a primary carrier frame and a second carrier frame of a missile launching system according to an embodiment of the invention.
Figure 10:
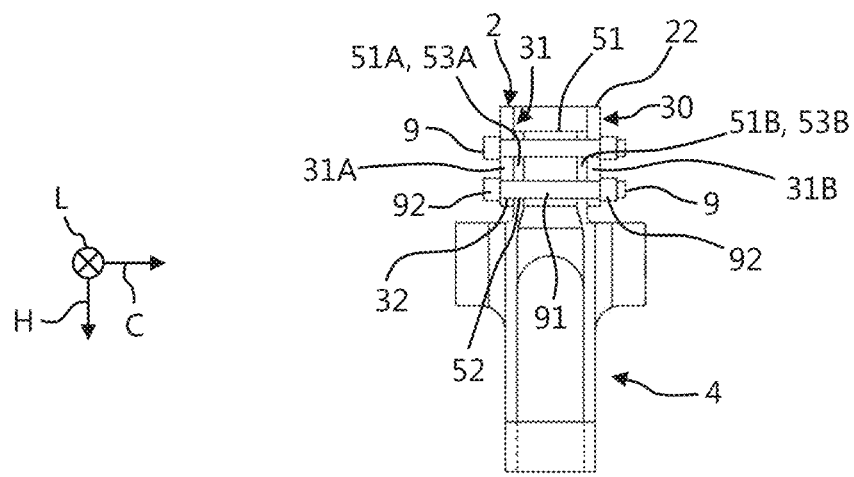
FIG. 10 is a cutaway sectional view of a connection between the primary carrier frame and the second carrier frame of a missile launching system according to an embodiment of the invention.
Figure 11:
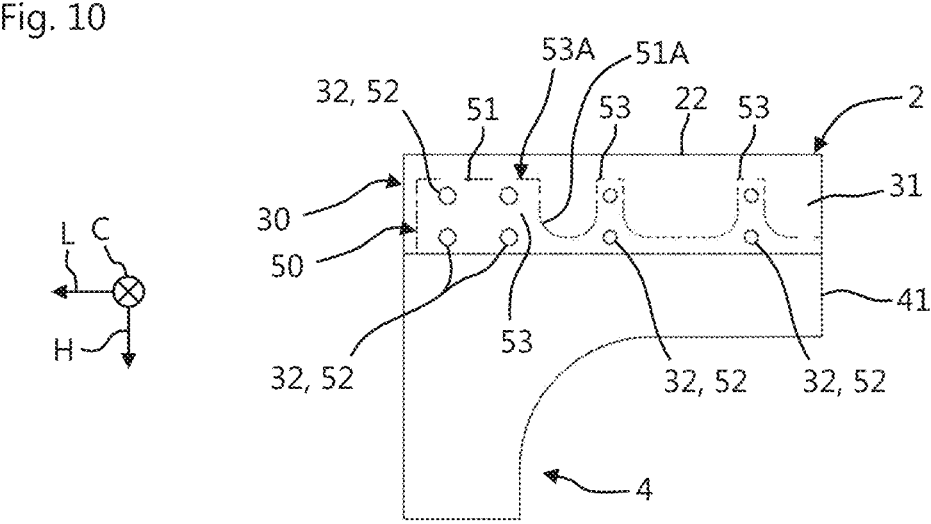
FIG. 11 is a side view of the connection shown in FIG. 10.

FIGS. 1 to 6 each show first examples of missile launching systems 1. FIGS. 7 and 8 show further examples of missile launching systems 100 by way of example. FIGS. 9 to 11 each illustrate carrier frames 2, 4, which can be both part of missile launching systems 1, as described below with reference to FIGS. 1 to 6, as well as part of missile launching systems 100, as will be described below with reference to FIGS. 7 and 8.

Figure 12:
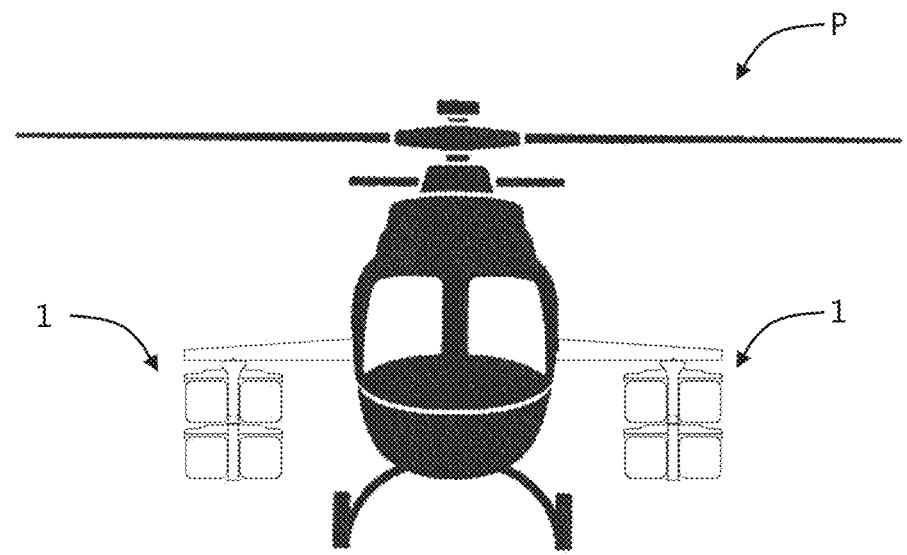
FIG. 12 is a schematic view of an aircraft which has a missile launching system according to a further embodiment of the invention.

A mobile platform P designed as a helicopter is shown purely by way of example in FIG. 12. The missile launching systems 1, 100, which are described in more detail below with reference to FIGS. 1 to 8 can be fastened to the mobile platform P and are used to launch or fire missiles (not shown), such as guided missiles, ballistic missiles or the like, from the mobile platform P.

Figure 1:
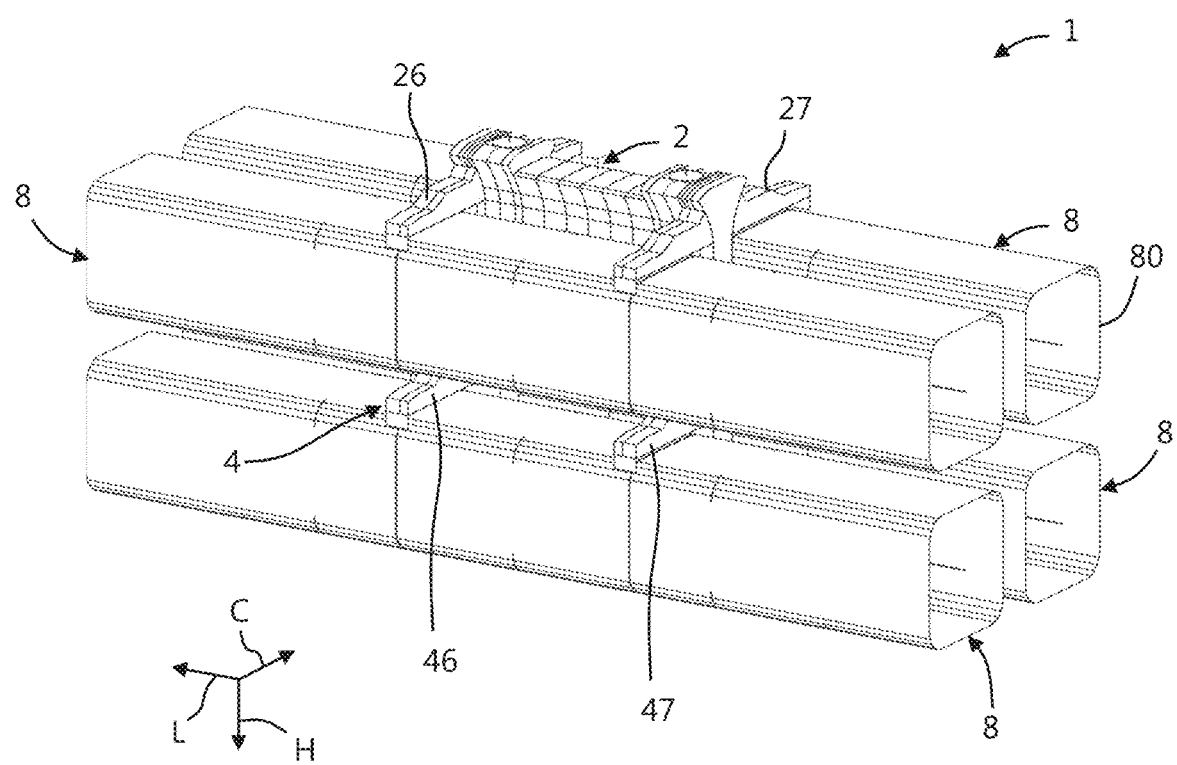
FIG. 1 is a perspective view of a missile launching system according to an embodiment of the invention.
Figure 2:
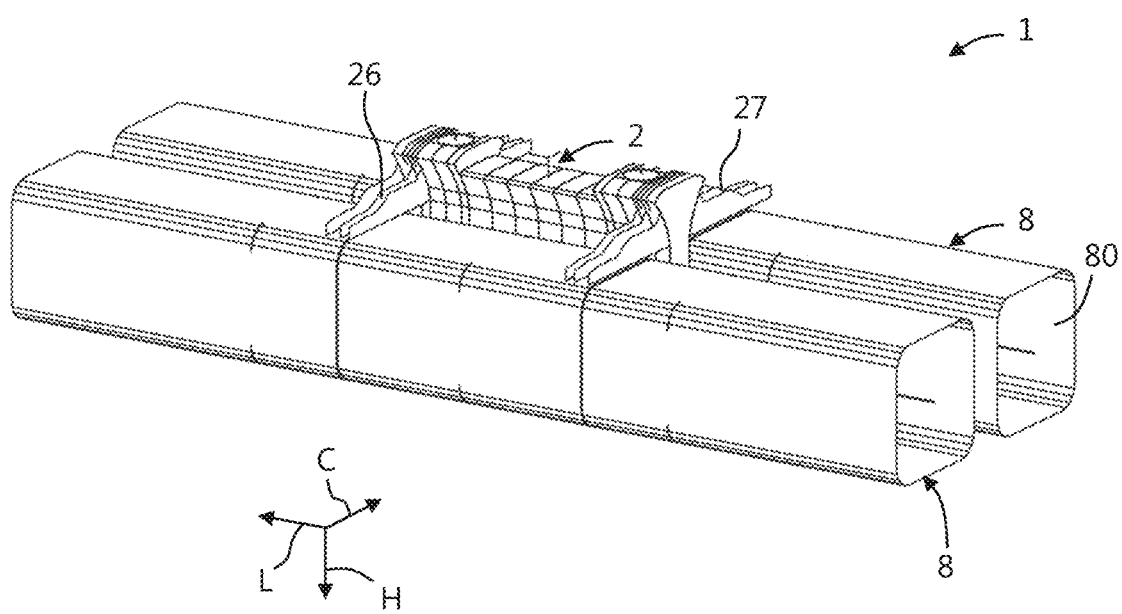
FIG. 2 is a perspective view of a missile launching system according to a further embodiment of the invention.

The launching system 1 shown as an example in FIG. 1 has a primary carrier frame 2 and an optional second carrier frame 4 connected thereto. Two launch tubes 8 are fastened to each of the carrier frames 2, 4. In FIG. 2, a further launching system 1 is shown by way of example, which only has the primary carrier frame 2, to which two launch tubes 8 are fastened. In general, at least one launch tube 8 can be provided for each carrier frame 2, 4. The missile launching system 10 shown by way of example in FIGS. 7 and 8 also has a primary carrier frame 2 and can optionally also have a further, second carrier frame 4 (not shown in FIGS. 7 and 8).

FIG. 9 shows, purely by way of example, a first carrier frame 2 or a primary carrier frame 2 and an optional second carrier frame 4. The carrier frames 2, 4 are each rectangular and extend along a longitudinal direction L.

As shown by way of example in FIG. 9, the first carrier frame or the primary carrier frame 2 can have a first longitudinal beam 21 which extends in or along the longitudinal direction L, a second longitudinal beam 22 which extends in or along the longitudinal direction L which is arranged spaced apart from the first longitudinal beam 21 in a vertical direction H extending transverse to the longitudinal direction L, a first connecting beam 23 which extends between the first and the second longitudinal beam 21, 22, and a second connecting beam 24 which extends between the first and the second longitudinal beam 21, 22 and is arranged spaced apart from the first connecting beam 23 in the longitudinal direction L. As is further illustrated by way of example in FIG. 9, the first connecting beam 23 can extend between a first end portion 21A of the first longitudinal beam 21 and a first end portion 22A of the second longitudinal beam 22, and the second connecting beam 24 can extend between a second end portion 21B of the first longitudinal beam 21, opposite to the first end portion 21A with respect to the longitudinal direction L, and a second end portion 22B of the second longitudinal beam 22 which is opposite to the first end portion 22A with respect to the longitudinal direction L. It is also conceivable for the end portions 21A, 21B of the first longitudinal beam 21 to project beyond the first connecting beam 23 and/or beyond the second connecting beam 24 with respect to the longitudinal direction L. Of course, it is also conceivable for the end portions 22A, 22B of the second longitudinal beam 22 to project beyond the first connecting beam 23 and/or beyond the second connecting beam 24 with respect to the longitudinal direction L.

Figure 5:
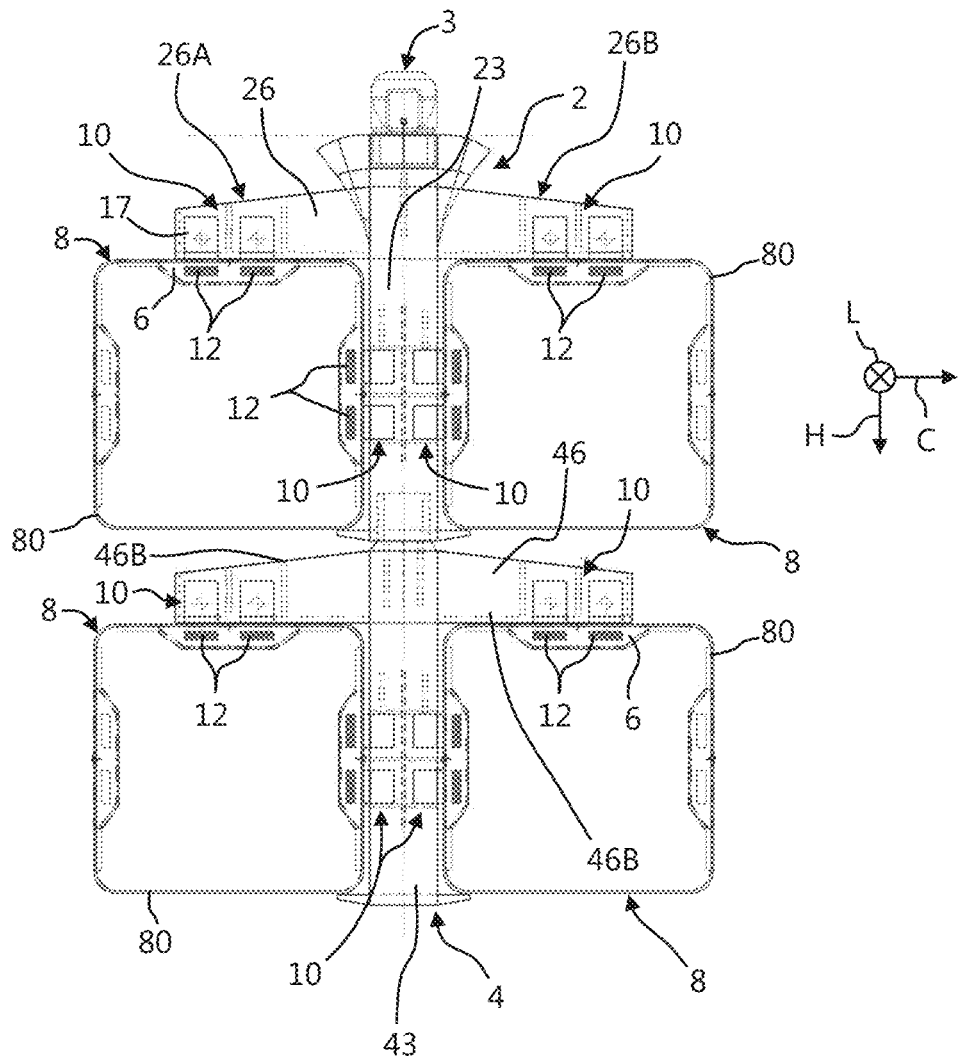
FIG. 5 is a sectional view of a missile launching system according to a further embodiment of the invention.

As shown in particular in FIGS. 5 and 8, platform coupling structures can be formed on the first longitudinal beam 21. In general, at least one platform coupling structure is provided on the primary carrier frame 2. The platform coupling structure 3 is used to releasably attach the primary carrier frame 2 to the mobile platform P. For example, a first and a second platform coupling structure can each be formed in the end portions 21A, 21B, respectively, of the first longitudinal beam 21. The first longitudinal beam 21 in this case can have regions 5A, 5B in the end portions 21A, 21B, said regions each being on a top side and projecting in the vertical direction H. Platform coupling structures designed as lugs, for example, can be arranged on each of these projecting regions 5A, 5B, as is shown in FIGS. 5 and 8 purely by way of example, and only schematically. The at least one platform coupling structure 3 can be designed, for example, in accordance with the MIL-STD-8591 standard.

As is also shown by way of example in FIG. 9, the primary carrier frame 2 can furthermore have at least one optional stiffening strut 28, which can extend, for example, as shown in FIG. 9, between the first and the second connecting beam 23, 24. In general, the at least one stiffening strut 28 extends between two beams from the group consisting of the first longitudinal beam 21, the second longitudinal beam 22, the first connecting beam 23 and the second connecting beam 24.

The longitudinal beams 21, 22, the connecting beams 23, 24 and the stiffening strut 28 of the first carrier frame 2 can, for example, be welded to each other, machined from a solid material, formed in an additive manufacturing process or manufactured in one piece in another way. Of course, the longitudinal beams 21, 22, the connecting beams 23, 24 and the stiffening strut 28 of the first carrier frame 2 can also be bolted, riveted or connected to each other in some other way.

As shown in FIGS. 1, 2, 5, 6, 8 and 9 by way of example, the primary carrier frame 2 can have at least one first transverse beam 26. FIGS. 1, 2, 7 and 9 show, purely by way of example, that one of the primary carrier frames 2 has a first transverse beam 26 which is at the front with respect to the longitudinal direction L, and a first transverse beam 27 which is at the rear with respect to the longitudinal direction L and is spaced apart from the first transverse beam 26 at the front in the longitudinal direction L. FIGS. 1, 2, 7 and 9 also show, by way of example, that the front first transverse beam 26 is arranged in the first end portion 21A of the first longitudinal beam 21, and the rear first transverse beam 27 is arranged in the second end portion 22A of the first longitudinal beam 21. As shown in FIGS. 1, 2, 7 and 9, also purely by way of example, the at least one first transverse beam 26, 27 can be arranged in the region of the first longitudinal beam 21 with respect to the vertical direction H. Regardless of the arrangement of the transverse beams 26, 27, it is also conceivable for the end portions 21A, 21B of the first longitudinal beam 21 to project beyond the first connecting beam 23 and/or beyond the second connecting beam 24 with respect to the longitudinal direction L. In this case, the transverse beams 26, 27 can also be arranged in the end portions 21A, 21B of the first longitudinal beam 21 which project beyond the connecting beams 23, 24. In the same way, the transverse beams 26, 27 can also be arranged in end portions 22A, 22B of the second longitudinal beam 22 that project beyond the two connecting beams 23, 24.

As shown in particular in FIGS. 5, 8 and 9, the at least one first transverse beam 26, 27 extends transverse to the longitudinal beams 21, 22 or in a transverse direction C which runs transverse to the longitudinal direction L and transverse to the vertical direction H. The transverse beams 26, 27 can in particular each have a first transverse beam portion 26A, 27A which extends with respect to the transverse direction C on a first side of the longitudinal beams 21, 22, and a second transverse beam portion 26B, 27B which extends with respect to the transverse direction C on a second side of the longitudinal beams 21, 22, as shown by way of example in FIGS. 5, 8 and 9. The first transverse beam portion 26A, 27A and the second transverse beam portion 26B, 27B can each extend symmetrically with respect to the longitudinal beams 21, 22 and the transverse direction C, respectively.

The at least one first transverse beam 26, 27 can in particular be formed in one piece with the first longitudinal beam 21. For example, the transverse beam portions 26A, 26B, 27A, 27B can be welded to the longitudinal beam 21. In general, the at least one first transverse beam 26, 27 can be formed in one piece with one of the beams from the group consisting of the first longitudinal beam 21, the second longitudinal beam 22, the first connecting beam 23 and the second connecting beam 24. Alternatively, the at least one first transverse beam 26, 27 can be bolted, riveted or otherwise connected to one of the beams from the group consisting of the first longitudinal beam 21, the second longitudinal beam 22, the first connecting beam 23 and the second connecting beam 24.

The optional second carrier frame 4 can be substantially constructed in the same way as the first carrier frame 2. As shown by way of example in FIG. 9, the second carrier frame 4 can have a third longitudinal beam 41 which extends in the longitudinal direction L and a fourth longitudinal beam 42 which is arranged spaced apart from the third longitudinal beam 41 in the vertical direction H. Furthermore, the second carrier frame 4 can have a third connecting beam 42, which connects the third and fourth longitudinal beams 41, 42, and a fourth connecting beam 44 which is arranged spaced apart from the third longitudinal beam 43 with respect to the longitudinal direction L and which connects the third and fourth longitudinal beams 41, 42. As is further illustrated by way of example in FIG. 9, the third connecting beam 43 can extend between a first end portion 41A of the third longitudinal beam 41 and a first end portion 42A of the fourth longitudinal beam 42, and the fourth connecting beam 44 can extend between a second end portion 41B of the third longitudinal beam 41, which is opposite to the first end portion 41A with respect to the longitudinal direction L, and a second end portion 42B of the fourth longitudinal beam 42, which is opposite to the first end portion 42A with respect to the longitudinal direction L. It is also conceivable for the end portions 41A, 41B of the third longitudinal beam 41 to project beyond the third connecting beam 43 and/or beyond the fourth connecting beam 44 with respect to the longitudinal direction L. Of course, it is also conceivable for the end portions 42A, 42B of the fourth longitudinal beam 42 to project beyond the third connecting beam 43 and/or beyond the fourth connecting beam 44 with respect to the longitudinal direction L. In the same way, the transverse beams 46, 47 can also be arranged in end portions 42A, 42B of the fourth longitudinal beam 42 that project beyond the connecting beams 43, 44.

As is also shown by way of example in FIG. 9, the second carrier frame 4 can have at least one optional stiffening strut 48. In FIG. 9, shown purely by way of example, a stiffening strut 48 is provided which extends between the third and fourth connecting beams 43, 44. In general, the at least one stiffening strut 48 extends between two beams from the group consisting of the third longitudinal beam 41, the fourth longitudinal beam 42, the third connecting beam 43 and the fourth connecting beam 44.

The longitudinal beams 41, 42, the connecting beams 43, 44 and the stiffening strut 48 of the second carrier frame 4 can, for example, be welded to each other, machined from a solid material, formed in an additive manufacturing process, or manufactured in one piece in another way. Of course, the longitudinal beams 41, 42, the connecting beams 43, 44 and the stiffening strut 48 of the second carrier frame 4 can also be bolted, riveted or connected to each other in some other way.

As can be seen in particular in FIGS. 1, 5 and 9, the second carrier frame 4 can have at least one second transverse beam 46, 47. FIG. 9 shows, purely by way of example, that the second carrier frame 4 has a second transverse beam 46 which is at the front with respect to the longitudinal direction L, and a second transverse beam 47 which is at the rear with respect to the longitudinal direction L and is spaced apart in the longitudinal direction L from the second front transverse beam 46. FIG. 9 also shows, by way of example, that the front second transverse beam 46 is arranged in the first end portion 41A of the third longitudinal beam 41 and the rear second transverse beam 47 is arranged in the second end portion 42A of the third longitudinal beam 41. As is furthermore shown purely by way of example in FIG. 9, the at least one second transverse beam 46, 47 can be arranged in the region of the third longitudinal beam 41 with respect to the vertical direction H. Regardless of the arrangement of the transverse beams 46, 47, it is also conceivable for the end portions 41A, 41B of the third longitudinal beam 41 to project beyond the third connecting beam 43 and/or the fourth connecting beam 44 with respect to the longitudinal direction L. In this case, the transverse beams 46, 47 can also be arranged in the end portions 41A, 41B of the third longitudinal beam 41 that project beyond the connecting beams 43, 44. In the same way, the transverse beams 46, 47 can also be arranged in end portions 42A, 42B of the fourth longitudinal beam 42 that project beyond the connecting beams 43, 44.

As shown in particular in FIGS. 5 and 9, the at least one second transverse beam 46, 47 extends transverse to the longitudinal beams 41, 42 or in the transverse direction C. The second transverse beams 46, 47 can in particular each have a first transverse beam portion 46A, 47A which extends on a first side of the longitudinal beams 41, 42 with respect to the transverse direction C, and a second transverse beam portion 46B, 47B which extends on a second side of the longitudinal beams 41, 42 with respect to the transverse direction C, as shown by way of example in FIGS. 5 and 9. The first transverse beam portions 46A, 47A and the second transverse beam portions 46B, 47B can each extend symmetrically with respect to the longitudinal beams 41, 42 and the transverse direction C.

Figure 3:
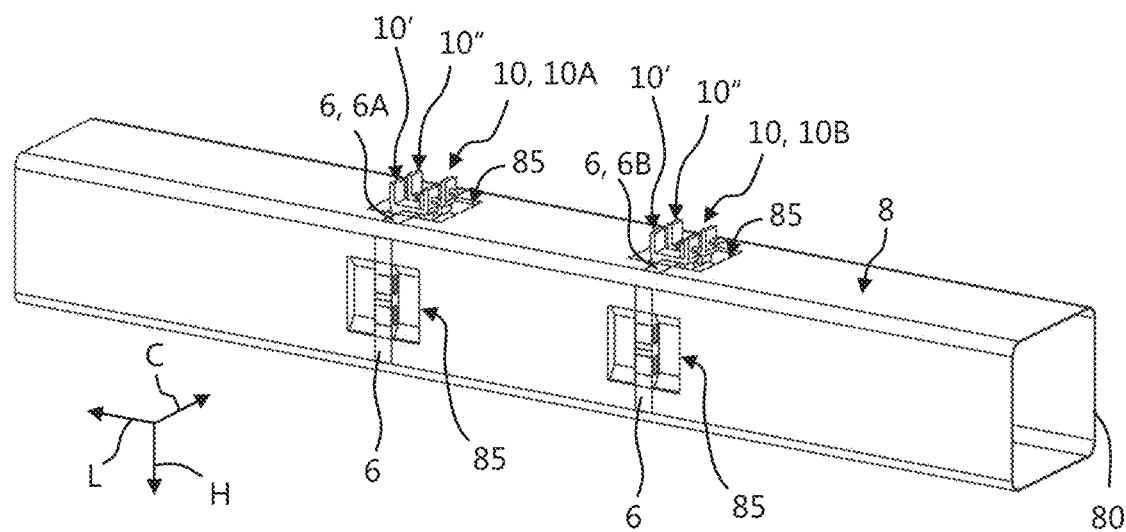
FIG. 3 is a perspective view of a launch tube of a missile launching system according to a further embodiment of the invention.

The at least one second transverse beam 46, 47 can in particular be formed in one piece with the third longitudinal beam 41, as shown schematically in FIGS. 3 and 4. For example, the transverse beam portions 46A, 46B, 47A, 47B can be welded to the longitudinal beam 41. In general, the at least one first transverse beam 46, 47 can be formed in one piece with one of the beams from the group consisting of the third longitudinal beam 41, the fourth longitudinal beam 42, the third connecting beam 43 and the fourth connecting beam 44. Alternatively, the at least one second transverse beam 46, 47 can be bolted, riveted or otherwise connected to one of the beams from the group consisting of the third longitudinal beam 41, the fourth longitudinal beam 42, the third connecting beam 43 and the fourth connecting beam 44.

The longitudinal beams 21, 22, 41, 42, the optional connecting beams 23, 24, 43, 44, the optional transverse beams 26, 27, 46, 47, and the optional stiffening strut 28, 48 can each be designed as hollow profiles. The longitudinal beams 21, 22, 41, 42, the optional connecting beams 23, 24, 43, 44, the optional transverse beams 26, 27, 46, 47, and the optional stiffening strut 28, 48 can each have a rectangular cross section, as shown in FIGS. 1 to 7 by way of example. Of course, other cross-sectional shapes are also conceivable. The longitudinal beams 21, 22, 41, 42, the optional connecting beams 23, 24, 43, 44, the optional transverse beams 26, 27, 46, 47, and the optional stiffening strut 28, 48 can each be made of a metal material, for example an aluminium alloy, a structural steel, a titanium alloy or a similar high-strength material.

As shown in FIGS. 5 and 9, by way of example and purely schematically, the second longitudinal beam 22 of the primary carrier frame 2 can optionally have a first connecting structure 30 on an underside oriented away from the first longitudinal beam 21 with respect to the vertical direction H. Correspondingly, the third longitudinal beam 41 of the optional second carrier frame 4 can have a second connecting structure 50 on a top side, which is oriented with respect to the vertical direction H opposite to the optional fourth longitudinal beam 42, as shown by way of example and purely schematically in FIGS. 5 and 9. As shown in particular in FIGS. 10 and 11, the primary carrier frame 2 and the second carrier frame 4 can be connected to each other or fastened to each other with the aid of the first and second connecting structures 30, 50.

The optional first connecting structure 30 of the primary carrier frame 2 defines a first plug connection portion 31 which extends in the longitudinal direction L and which is configured to establish a plug connection with a complementary second plug connection portion 51 of the second connecting structure 50 of the second carrier frame 4. As shown in FIG. 5 and FIGS. 9 to 11, by way of example, the first plug connection portion 31 can for example be designed as a recess which extends in the longitudinal direction L, and thus as a socket. The recess can in this case, as shown by way of example in particular in FIG. 10, be defined by profile side walls 31A, 31B of the second longitudinal beam 22 lying opposite each other in the transverse direction C. Alternatively, it is also conceivable for the first plug connection portion 31 to be formed by a lug arrangement (not shown) projecting from the underside of the second longitudinal beam 22 in the vertical direction H, i.e. as a plug connector which extends in the longitudinal direction L. The first connecting structure 30 can thus be formed by an end portion of the first carrier frame or of the primary carrier frame 2, in particular of the second longitudinal beam 22, which portion is lower with respect to the vertical direction H.

The optional first connecting structure 30 thus generally defines a first plug connection portion 31 which extends in the longitudinal direction L. This can, for example, extend substantially over the entire longitudinal extension of the second longitudinal beam 22. In general, the first plug connection portion 31, for example the recess defined by the profile side walls 31A, 31B, can extend over at least 80 percent of a length of the second longitudinal beam 22 with respect to the longitudinal direction L.

As shown in FIG. 11, the optional first connecting structure 30 has at least two first through-bores 32 spaced apart in the longitudinal direction L. As shown in FIGS. 10 and 11, the through-bores 32 can be formed in the profile side walls 31A, 31B, and pass completely through them. In general, the through-bores 32 can each extend in the transverse direction C. FIG. 11 shows, by way of example, that a plurality of first through-bores 32 are provided along the longitudinal direction L. Optionally, a row of first through-bores 32, which is lower with respect to the vertical direction H, and an upper row of first through-bores 32 which is arranged spaced apart from the first row with respect to the vertical direction H, can be provided, as illustrated by way of example in FIG. 11.

The optional second connecting structure 50 also defines a second plug connection portion 51 which extends in the longitudinal direction L and which is designed to be complementary to the first plug connection portion 31, such that it can be attached to the first plug connection portion 31 of the primary carrier frame 2 in the vertical direction H, as is symbolically indicated by the arrows A9 shown in FIG. 9. As shown in FIGS. 9 to 11, the second plug connection portion 51 can for example be designed as a lug arrangement which extends in the longitudinal direction L, and thus as a plug connector. FIGS. 9 to 11 show, by way of example, that the lug arrangement can be formed by two walls 51A, 51B which are opposite each other with respect to the transverse direction and which extend continuously in the longitudinal direction L between the first and second end portions 41A, 41B of the third longitudinal profile 41, and protrude from the top side of the third longitudinal profile 41 in the vertical direction H. The walls 51A, 52A here form lug profiles 53A, 53B which lie opposite each other with respect to the transverse direction. In FIG. 11, a lug arrangement is shown by way of example which has several lug portions 53 which are spaced apart from each other with respect to the longitudinal direction L and which each protrude from the top side of the third longitudinal profile 41 in the vertical direction H. The lug portions 53 together form a lug profile 53A. As shown by way of example in FIG. 10, the lug arrangement can generally have two lug profiles 53A, 53B which lie opposite each other and are spaced apart in the transverse direction C. Alternatively, it is also conceivable for the second plug connection portion 51 to be formed by a recess (not shown) formed on the top side of the third longitudinal beam 41 and which extends in the longitudinal direction L—that is, is formed as a socket. The second connecting structure 50 can thus be formed by an end portion of the second carrier frame 4, in particular of the third longitudinal beam 42, which is at top with respect to the vertical direction H.

The second connecting structure 50 thus generally defines a second plug connection portion 51 which extends in the longitudinal direction L. This can, for example, extend substantially over the entire longitudinal extension of the third longitudinal beam 41. In general, the second plug connection portion 51, i.e. for example the lug arrangement defined by the profile side walls 51A, 51B or the lug profiles 53A, 53B, can extend over at least 80 percent of a length of the third longitudinal beam 41 with respect to the longitudinal direction L.

As shown by way of example in FIG. 11, the second connecting structure 50 has at least two second through-bores 52 spaced apart in the longitudinal direction L. The second through-bores 52 are arranged to correspond to the first through-bores 32 of the first connecting structure 30. That is, when the first and the second plug profile portions 31, 51 are inserted into each other, as shown in FIGS. 10 and 11, the first and second through-bores 32, 52 are in alignment or are coaxial with each other. As shown in FIGS. 10 and 11, the second through-bores 52 can be formed in the lug portions 53 or generally in the lug profiles 53A, 53B and pass through them completely. In general, the through-bores 52 can each extend in the transverse direction C. FIG. 11 shows, by way of example, that a plurality of second through-bores 52 is provided along the longitudinal direction L. Optionally, a row of second through-bores 52, which is lower with respect to the vertical direction H, and an upper row of second through-bores 52 which is arranged spaced apart from the first row with respect to the vertical direction H, can be provided, as illustrated by way of example in FIG. 11.

As shown by way of example in FIG. 9, the primary carrier frame 2 and the optional second carrier frame 4 can be attached together by plugging in a simple manner, as indicated by the arrows A9, if optional connecting structures 30, 50 are provided on the carrier frames 2, 4 as described above. For this purpose, the second plug connection portion 51 of the second carrier frame 4 is fitted in the vertical direction H to the first plug connection portion 31 of the first carrier frame 2. In the example shown in FIG. 9, the lug arrangement of the second carrier frame 4 defined by the profile side walls 51A, 51B is inserted in particular into the recess defined by the profile side walls 31A, 31B of the second longitudinal beam 22 of the first carrier frame 2.

In order to fasten together the plug connection portions 31, 51 which are attached to each other or pushed into each other, connecting devices 9 are passed through the through-bores 32, 52, as is shown schematically in FIG. 10. The connecting devices 10 can, for example, be designed as bolts, rivets, screws or the like. In general, the connecting devices 9 thus have a shaft 91 which can be passed through the through-bores 32, 52. The connecting device 9 can be fixed with respect to the transverse direction, for example by means of screw nuts 92, as is shown schematically and by way of example in FIG. 10.

In the case of the launching system 1 shown by way of example in FIGS. 1 to 6, the primary carrier frame 2 and optionally the optional second carrier frame 4 each have at least one locking device 10. In particular, at least one locking device 10 is provided for each launch tube 8. As shown purely by way of example in FIG. 5, for each launch tube 8, one locking device 10 can be arranged on or fastened to the at least one transverse beam 26, 46, and one locking device 10 can be arranged on or fastened to each connecting beam 23, 43 of the carrier frame 2, 4.

Figure 4A:
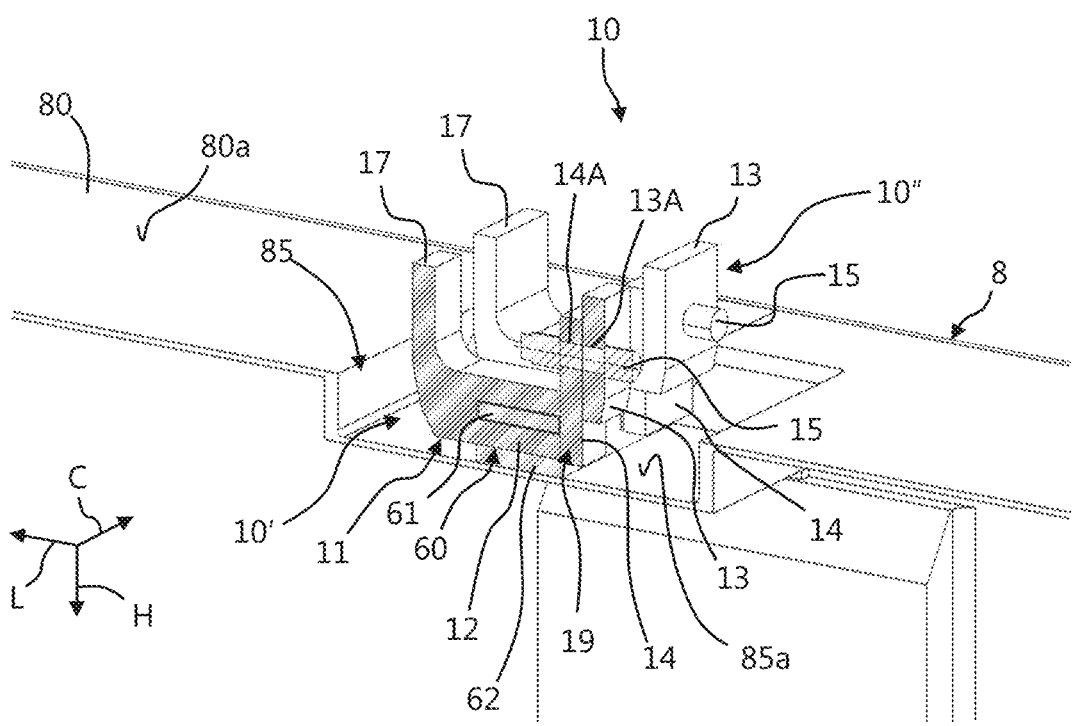
FIG. 4A is a detailed view of the launch tube of FIG. 3, in a state in which the launch tube is locked to a locking device of a primary carrier frame of a missile launching system according to an embodiment of the invention.
Figure 4B:
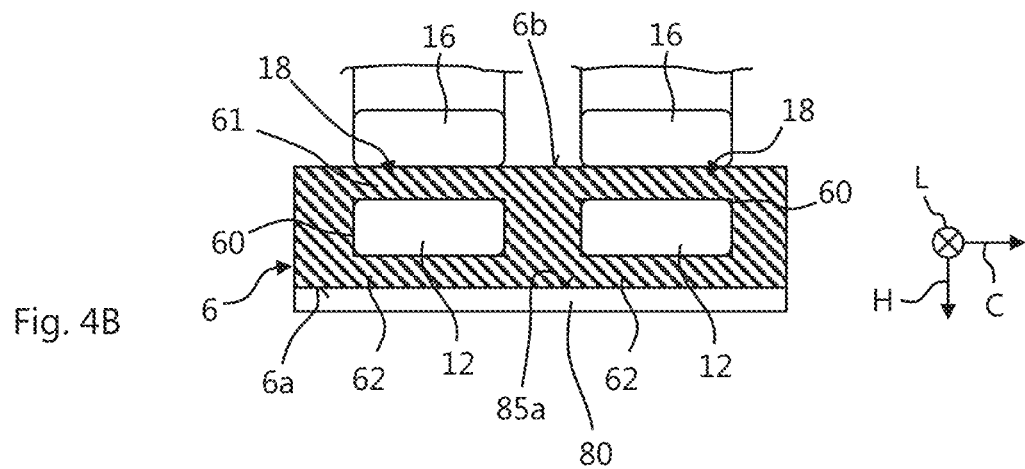
FIG. 4B is a cutaway sectional view of the detail shown in FIG. 4A.

FIGS. 3, 4A and 4B show an example of a locking device 10 in detail, together with a launch tube 8, in a state in which the launch tube 8 or a fastening bracket 6 of the launch tube 8 is locked with the locking device 10.

As is shown in particular in FIG. 4A, the locking device 10 has a lock hook 11, a stop piece 13 and a locking plate 14.

The lock hook 11 has a receiving piece 12 and can additionally have an optional guide piece 16, as shown in FIG. 4A, 4B by way of example. The receiving piece 12 is implemented as an elongated or block-shaped part which preferably has a non-circular cross section. FIGS. 4A and 4B show a receiving piece 12 with a rectangular cross section, purely by way of example. The lock hook 11 can have a support part 17 provided for fastening to the carrier frame 2, 4 (not shown in FIGS. 3, 4A and 4B), from which part the receiving piece 12 extends. The optional guide piece 16 can also extend from the support part 17, in particular parallel to the receiving piece 12, such that a guide gap 18 is defined between the guide piece 16 and the receiving piece 12.

The lock hook 11 is fastened to the given carrier frame 2, 4, for example by the support part 17 being bolted, riveted, welded, or connected in a similar manner to the carrier frame 2, 4. In particular, the lock hook 11 is fastened to or arranged on the given carrier frame 2, 4 in such a manner that it projects from the carrier frame 2, 4, and the receiving piece 12 extends in the longitudinal direction L. The receiving piece 12 is thus arranged at a certain distance from the carrier frame 2, 4 or the given beam 21, 41, 22, 42, 23, 43, 24, 44, 26, 46, 27, 47, 28, 48.

The stop piece 13 of the locking device 10 can be implemented, for example, as a planar part or as a stop plate, as illustrated by way of example in FIG. 4A. The stop piece 13 is arranged opposite the receiving piece 12 of the lock hook 11 in such a manner that a locking gap 19 is formed between the stop piece 13 and the receiving piece 12. In general, the stop piece 13 extends transverse to the receiving piece 13 and can, for example, extend parallel to the support part 17, as illustrated by way of example in FIG. 4A. The stop piece 13 is also fastened to the given carrier frame 2, 4, for example by the stop piece 13 being bolted, riveted, welded or connected in a similar manner to the carrier frame 2, 4. The stop piece 13 can thus generally be arranged spaced apart from the receiving piece 12 in the longitudinal direction L, such that a locking gap 19 is formed between the stop piece 13 and the receiving piece 12.

The locking plate 14 is implemented as a plate which can be inserted into the locking gap 19, i.e. between the receiving piece 12 and optionally the optional guide piece 13 and the stop piece 13, with respect to the longitudinal direction L. The locking plate 14 can have a thickness which corresponds to the distance between the receiving piece 12 and the stop piece 13, such that the locking plate 14 fills the locking gap 19 when it is inserted therein.

As is also shown by way of example in FIG. 4A, the stop piece 13 and the locking plate 14 can each have a passage 13A, 14A. The passages 13A, 14A are arranged in this case both on the stop piece 13 and the locking plate 14 in such a manner that the passage 13A of the stop piece 13 and the passage 14A of the locking plate 14 are aligned or coaxial with each other when the locking plate 14 is inserted into the locking gap 19 between the stop piece 13 and the receiving piece 12, as illustrated by way of example in FIG. 4A. An optional locking bolt 15 can then be passed through the passage 13A of the stop piece 13 and the passage 14A of the locking plate 14 in order to fix the locking plate 14 in a stationary manner with respect to the stop piece 13.

As shown in FIGS. 3, 4A and 4B as an example, each locking device 10 can have two locking units 10', 10" arranged side by side, wherein each locking unit 10', 10" can have a lock hook 11, a stop piece 13, a locking plate 14 and an optional locking bolt 15, as described in detail above.

It is also conceivable for a first locking device 10A and a second locking device 10B to be provided on the primary carrier frame 2 and/or the optional second carrier frame 4, the second locking device 10B being arranged spaced apart from the first locking device 10A with respect to the longitudinal direction L, as is shown schematically in FIG. 3. As can also be seen in FIG. 3, the second locking device 10B can optionally also have two locking units 10', 10" arranged next to each other, as described above.

The components of the locking device 10, i.e. the lock hook 11, the stop piece 13, the locking plate 14 and optionally the optional locking bolt 15 can be made of a metal material, in particular aluminium, an aluminium alloy, a structural steel, titanium or the like.

As shown in FIGS. 4A and 4B, each of the launch tubes 8 can be fastened or locked to the locking device 10 of the given carrier frame 2, 4 via a fastening bracket 6. As shown in particular in FIGS. 1 to 3, the launch tubes 8 can be implemented as tubes which extend in the longitudinal direction L. As shown by way of example in particular in FIG. 5, the launch tubes 8 can each have a rectangular cross section with rounded corners. Of course, other cross-sectional shapes are also conceivable; for example, the launch tubes 8 can have a circular cross section. The cross-sectional shape of the launch tubes 8 is defined by a launch tube wall 80 which extends in the longitudinal direction L. The launch tube wall 80 of the launch tubes 8 can be formed from a thin sheet metal, for example. A metal material, for example a structural steel or an aluminium alloy, can be used as the material.

As shown in FIGS. 3, 4A and 4B, by way of example and schematically, the launch tube 8 has at least one fastening bracket 6. In general, the launch tube 8 has a number of fastening brackets 6 corresponding to the number of locking devices 10 which are provided on one side of the given carrier frame 2, 4 with respect to the transverse direction C.

The fastening bracket 6 can be implemented as a block-shaped or bar-shaped part, as illustrated by way of example in FIG. 3. The fastening bracket 6 has a fastening recess 60, preferably in the form of a through-recess. The fastening recess 60 has a cross-sectional shape designed to correspond to the cross section of the receiving piece 12 of the lock hook 11 of the locking device 10. The fastening recess 60 can in particular have a non-circular cross section, for example a rectangular cross section, as illustrated by way of example in FIG. 4B.

The fastening bracket 6 is fastened to the launch tube wall 80 of the launch tube 8, for example bolted, riveted, welded, or connected to it in a similar manner. As shown purely by way of example in FIG. 3, the launch tube wall 80 of the launch tube 8 forms a depression 85, for example with a rectangular peripheral edge. The fastening bracket 6 can be arranged in particular in the depression 85 of the launch tube wall 80. For example, the fastening bracket 6 rests with a first surface 6a on a bottom 85a of the depression 85; and a second surface 6b of the fastening bracket 6, which is opposite to the first surface 6a, is aligned with a surface 80a of the launch tube wall 80 surrounding the depression 85 and/or lies in one plane therewith, as shown schematically in FIGS. 4A and 4B. The fastening bracket 6 can be made of a metal material, in particular aluminium, an aluminium alloy, a structural steel, titanium or the like.

Figure 6:
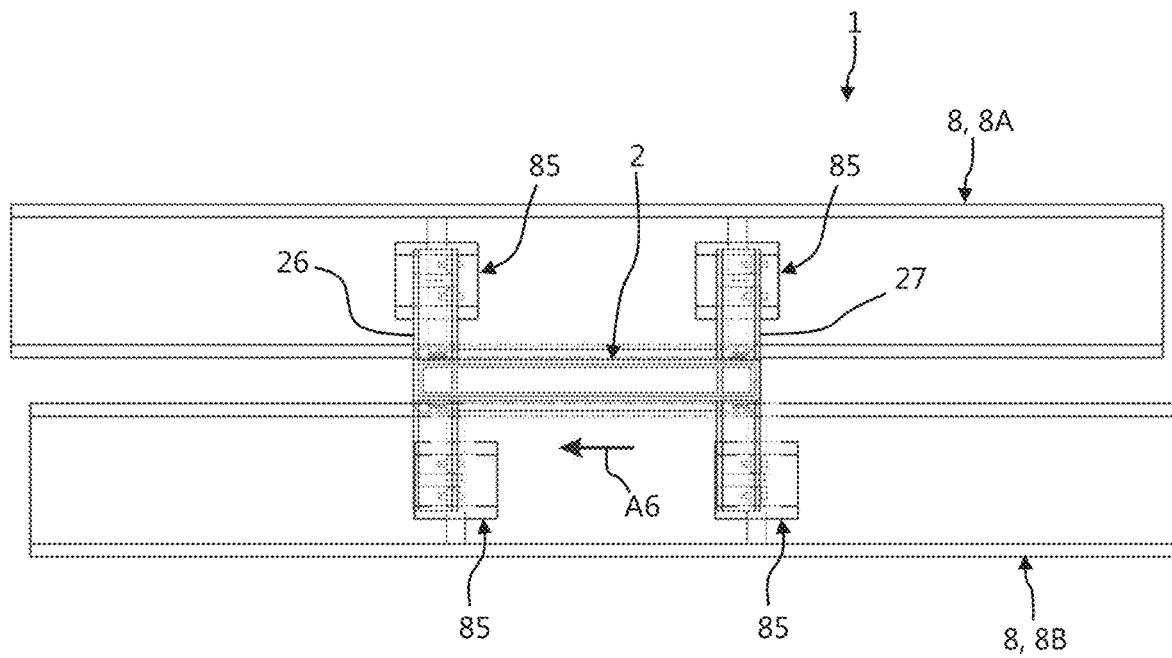
FIG. 6 is a plan view of a missile launching system according to an embodiment of the invention, during attachment of a missile launch tube to a primary carrier frame.

FIG. 6 shows an example of a plan view of a launching system 1 which has a carrier frame 2 with optional transverse beams 26, 27, locking devices 10 being arranged at least on the transverse beams 26, 27, for example as shown in FIG. 5 for the primary carrier frame 2 and for the second carrier frame 4. FIG. 6 schematically shows a step of installing the launch tube 8 on the carrier frame 2. A first launch tube 8A is already fastened to the carrier frame 2 or locked to it via the locking device 10 and the fastening bracket 6. To install a launch tube 8—in the example of FIG. 6, the second launch tube 8B—the launch tube 8 is positioned and the fastening bracket 6 is inserted into the locking gap 19 extending between the receiving piece 12 and the stop piece 13. In particular, the fastening recess 60 is arranged opposite and in particular in alignment with the stop piece 13 with respect to the longitudinal direction L. The entire launch tube 8, 8B can then be moved in the longitudinal direction L, as is symbolically shown in FIG. 6 by the arrow A6. As a result, the fastening bracket 6 of the launch tube 8 with the fastening recess 60 is pushed in the longitudinal direction L onto the receiving piece 12 of the lock hook 11 of the locking device 10. If an optional guide piece 16 is provided, an upper web 61 of the fastening bracket 6 delimiting the fastening recess 60 is inserted between the guide piece 16 and the receiving piece 12, the upper web 61 preferably resting on the guide piece 16, as shown purely by way of example in FIG. 4B. The guide piece 16 thus provides additional stabilization of the launch tube 8, 8B. A lower web 62 of the fastening bracket 6 delimiting the fastening recess can be inserted between the launch tube wall 80 and the receiving piece 12. As shown by way of example in FIG. 4B, the lower web 62 can rest against an outer surface of the launch tube wall 80, for example on the bottom 85a of the optional recess 85 of the launch tube wall 80, as shown by way of example in FIG. 4B. By inserting the locking plate 14 into the locking gap 19 between the stop piece 13 and the receiving piece 12, the fastening bracket 6 is locked with the lock hook 11. The optional locking bolt 15 can also be inserted into the passages 13A, 14A of the stop piece 13 and the locking plate 14. The launch tube 8 can thus be mounted on the carrier frame 2 in a simple manner, and the locking device 10 and the fastening bracket 6 ensure a mechanically robust and reliable locking of the launch tube 8 and the carrier frame 2.

FIGS. 7 and 8 show a further missile launching system 100 by way of example. The missile launching system 100 shown by way of example has a primary carrier frame 2, a first launch tube receiving device 110, a second launch tube receiving device 120 and at least one launch tube 8.

The primary carrier frame 2 can be designed as described above. In general, the primary carrier frame 2 can thus be implemented as a rectangular primary carrier frame 2 which extends in the longitudinal direction L and has at least one platform coupling structure 3. In particular, the primary carrier frame 2, as shown in FIGS. 7 and 8 by way of example, can have transverse beams 26, 27 which extend in the transverse direction C, as has already been described above. Of course, the primary carrier frame 2 can also have a first connecting structure 30 provided on an underside for connection to an optional second carrier frame 4. The missile launching system 100 shown by way of example in FIGS. 7 and 8 can thus likewise have an optional second carrier frame 4, which can be coupled to the primary carrier frame 2, as was explained in detail with reference to FIGS. 9 to 11.

As is shown schematically and by way of example in FIG. 8, the first launch tube receiving device 110 is designed as a closed first frame 111 defining a first receiving opening 112. For example, the first launch tube receiving device 110 can be designed as a rectangular frame which defines a cross section of the receiving opening 112 with a rectangular shape with rounded corners, as illustrated by way of example in FIG. 8. In general, the receiving opening 112 can have a cross-sectional shape that corresponds to an outer circumference 83 of the launch tube 8. The outer circumference 83 of the launch tube 8 is defined by the outer surface 80a of the launch tube wall 80 which defines the cross section of the launch tube 8.

As shown in FIGS. 7 and 8, the first launch tube receiving device 110 is arranged laterally on the carrier frame 2 with respect to the transverse direction C. With respect to the longitudinal direction L, the first launch tube receiving device 110 can be arranged, for example, in the region of the front transverse beam 26 and/or in the region of the first connecting beam 23 of the carrier frame 2. The first launch tube receiving device 110 is fastened to the carrier frame 2, for example releasably fastened. In particular, the first launch tube receiving device 110 can be bolted to the carrier frame 2, for example via threaded bolts 140, as is shown symbolically in FIG. 8. In particular, the first launch tube receiving device 110 can be fastened to the front transverse beam 26 and/or to the first connecting beam 22, as is shown purely by way of example in FIG. 8. In general, the first launch tube receiving device 110 can be fastened to at least one of the beams from the group consisting of the longitudinal beams 21, 41, 22, 42, the first connecting beam 23, the third connecting beam 43, the stiffening beam 28, 48 and the front transverse beam 26, 46.

The second launch tube receiving device 120 is designed as a closed first frame 121 defining a second receiving opening. In general, the second receiving opening can have a cross-sectional shape that corresponds to the outer circumference 83 of the launch tube 8.

As can be seen in FIG. 7, the second launch tube receiving device 120 is arranged laterally on the carrier frame 2 with respect to the transverse direction C. As can also be seen in FIG. 7, the second launch tube receiving device 120 is arranged spaced apart from the first launch tube receiving device 110 with respect to the longitudinal direction L. In particular, the first and second launch tube receiving devices 110 can be arranged such that a central axis of the first receiving opening 112 and a central axis of the second receiving opening are aligned or run coaxially. With respect to the longitudinal direction L, the second launch tube receiving device 120 can be arranged, for example, in the region of the rear transverse beam 26 and/or in the region of the second connecting beam 24 of the carrier frame 2. The second launch tube receiving device 120 is fastened to the carrier frame 2, for example releasably fastened. In particular, the second launch tube receiving device 120 can be bolted to the carrier frame 2, for example via threaded bolts 140. In particular, the second launch tube receiving device 120 can be fastened to the rear transverse beam 27 and/or to the second connecting beam 24. In general, the second launch tube receiving device 120 can be fastened to at least one of the beams from the group consisting of the longitudinal beams 21, 41, 22, 42, the second connecting beam 24, the fourth connecting beam 44, the stiffening beam 28, 48 and the rear transverse beam 27, 47.

As is shown purely by way of example in FIG. 8, a first launch tube receiving device 110 and a second launch tube receiving device 120 (not visible in FIG. 8) can be provided on both sides with respect to the transverse direction C, of the carrier frame 2, and can each be connected to the carrier frame 2 as described above.

As already explained, the at least one launch tube 8 has an outer circumference 83 that corresponds to the receiving openings 112 of the launch tube receiving devices 110, 120. The launch tube 8 can thus be inserted and/or pushed into the first and second receiving openings 112 of the launch tube receiving devices 110, 120 in the longitudinal direction L. A particularly simple installation of the launch tube 8 on the carrier frame 2 is thus possible. FIGS. 7 and 8 show, purely by way of example, a launching system 100 with two launch tubes 8. In general, the missile launching system 100 can have one launch tube 8 for the first and second launch tube receiving devices 110, 120 together.

After the launch tube 8 has been pushed into the receiving recesses 112, the launch tube 8 can be fastened to the launch tube receiving devices 110, 120 by means of connecting bolts 130. For example, the connecting bolts 130 can be implemented as screws 130. Screw holes with internal threads which, when the launch tube 8 is pushed into the receiving recesses 112, are aligned with the passages formed in the launch tube receiving devices 110, 120, can be formed in the launch tube wall 80 of each launch tube 8. As such, the connecting bolts 130 can easily be screwed in from the outside through the passages into the screw holes of the launch tube 8, as is shown purely symbolically in FIG. 8.

The launch tube receiving devices 110, 120 form sleeves which completely enclose the respective launch tube 8, with the outer circumference 83 of the launch tube 8 resting flat against the launch tube receiving devices 110, 120. An efficient mechanical stabilization of the launch tube 8 is achieved in this way. This can be further improved if the launch tube receiving devices 110, 120 have a certain extension in the longitudinal direction L and/or a longitudinal extension 1110, 1120, as is shown purely by way of example in FIG. 7. In general, the launch tube receiving devices 110, 120 each have a longitudinal extension 1110, 1120 which is in a range of between 4 percent and 10 percent of a total length 18 of the launch tube 8.

Although the present invention has been explained above with reference to embodiments, it is not restricted thereto, and can be modified in many ways. In particular, combinations of the preceding embodiments are also conceivable.

LIST OF REFERENCE SIGNS 1, 100 missile launching system
2 primary carrier frame
3 platform coupling structure
4 second carrier frame
5A, 5B projecting regions
6 fastening bracket
6a first surface of the fastening bracket
6b second surface of the fastening bracket
8 launch tube
8A first launch tube
8B second launch tube
10 locking device
10A first locking device
10B second locking device
10', 10" locking units
11 lock hook
12 receiving piece
13 stop piece
13A passage of the stop piece
14 locking plate
14A passage of the locking plate
15 locking bolt
16 guide piece
17 support part
18 guide gap
19 locking gap
21 first longitudinal beam
21A first end portion of the first longitudinal beam
21B second end portion of the first longitudinal beam
22 second longitudinal beam
22A first end portion of the second longitudinal beam
22B second end portion of the second longitudinal beam
23 first connecting beam
24 second connecting beam
26, 27 first transverse beam of the primary carrier frame
26A first transverse beam portion of the front first transverse beam
26B second transverse beam portion of the front first transverse beam
27A first transverse beam portion of the rear first transverse beam
27B second transverse beam portion of the rear first transverse beam
28 stiffening strut
30 first connecting structure
31 first plug connection portion
31A, 31B profile side walls
32, 52 through-bores
41 third longitudinal beam
41A first end portion of the third longitudinal beam
41B second end portion of the third longitudinal beam
42 fourth longitudinal beam
42A first end portion of the fourth longitudinal beam
42B second end portion of the fourth longitudinal beam
43 third connecting beam
44 fourth connecting beam
46, 47 second transverse beam of the second carrier frame
46A first transverse beam portion of the front second transverse beam
46B second transverse beam portion of the front second transverse beam 47A first transverse beam portion of the rear second transverse beam
47B second transverse beam portion of the rear second transverse beam
48 stiffening profile
50 second connecting structure
51 second plug connection portion
51A, 51B walls
53 lug portions
53A, 53B lug profiles
60 fastening recess
61 upper web
80 launch tube wall
80 surface of the launch tube wall
83 outer circumference of the launch tube
85 depression
85a bottom of the depression
91 shaft
92 nuts
110 first launch tube receiving device
111 first frame
112 first receiving opening
120 second launch tube receiving device
121 second frame
130 connecting bolt
140 threaded bolt
A9 arrows
L longitudinal direction
l8 total length of the launch tube
l110 length of the first launch tube receiving device
l120 length of the second launch tube receiving device
C transverse direction
H vertical direction
P mobile platform

The invention claimed is:

1. A missile launching system (1) for launching missiles from a mobile platform (P), comprising:
   a rectangular primary carrier frame (2) extending in a longitudinal direction (L) and having at least one platform coupling structure (3) for releasably fastening the first carrier frame (2) to the mobile platform (P), and at least one locking device (10) having a lock hook (11) that projects from the primary carrier frame (2) and has a receiving piece (12) extending in the longitudinal direction (L), a stop piece (13) extending transverse to the receiving piece (12), and a locking plate (14) which can be inserted between the receiving piece (12) and the stop piece (13) with respect to the longitudinal direction (L);
   at least one launch tube (8) having at least one fastening bracket (6) connected to a launch tube wall (80), which bracket has a fastening recess (60) designed to correspond to the receiving piece (12) of the lock hook (11) of the locking device (10);
   wherein the fastening bracket (6) of the launch tube (8), by means of the fastening recess (60), can be fitted in the longitudinal direction (L) to the receiving piece (12) of the lock hook (11) of the locking device (10), and can be locked with the lock hook (11) by inserting the locking plate (14) between the stop piece (13) and the receiving piece (12).

2. Missile launching system (1) according to claim 1, wherein the receiving piece (12) of the lock hook (11) of the locking device (10) and the fastening recess (60) have a non-circular cross section, in particular a rectangular cross section.

3. Missile launching system (1) according to claim 1, wherein the primary carrier frame (2) has a first locking device (10A), and a second locking device (10B) which is arranged spaced apart from the first locking device (10A) with respect to the longitudinal direction (L),
   wherein the first locking device (10A) has a lock hook (11) which projects from the primary carrier frame (2) and has a receiving piece (12) extending in the longitudinal direction (L), a stop piece (13) extending transverse to the receiving piece (12), and a locking plate (14) which can be inserted between the receiving piece (12) and the stop piece (13) with respect to the longitudinal direction (L),
   wherein the second locking device (10B) has a lock hook (11) which projects from the primary carrier frame (2) and has a receiving piece (12) extending in the longitudinal direction (L), a stop piece (13) extending transverse to the receiving piece (12), and a locking plate (14) which can be inserted between the receiving piece (12) and the stop piece (13) with respect to the longitudinal direction (L),
   wherein the launch tube has a first fastening bracket (6A), and a second fastening bracket (6B) arranged to the first fastening bracket (6A) with respect to the longitudinal direction (L),
   wherein the first fastening bracket (6A) has a fastening recess (60) designed to correspond to the receiving piece (12) of the lock hook (11) of the first locking device (10A),
   wherein the second fastening bracket (6B) has a fastening recess (60) designed to correspond to the receiving piece (12) of the lock hook (11) of the second locking device (10B),
   wherein the first fastening bracket (6A), by means of its fastening recess (60), can be fitted in the longitudinal direction (L) to the receiving piece (12) of the lock hook (11) of the first locking device (10A), and can be locked with the lock hook (11) of the first locking device (10A) by inserting the locking plate (14) of the first locking device (10A) between the stop piece (13) and the receiving piece (12) of the first locking device (10A), and
   wherein the second fastening bracket (6B), by means of its fastening recess (60), can be fitted in the longitudinal direction (L) to the receiving piece (12) of the lock hook (11) of the second locking device (10B), and can be locked with the lock hook (11) of the second locking device (10B) by inserting the locking plate (14) of the second locking device (10B) between the stop piece (13) of the second locking device (10B) and the receiving piece (12) of the second locking device (10B).

4. Missile launching system (1) according to claim 1, wherein the stop piece (13) and the locking plate (14) of the at least one locking device (10) each have a passage (13A, 14A), wherein the passage (13A) of the stop piece (13) and the passage (14A) of the locking plate (14) are coaxial with each other when the locking plate (14) is inserted between the stop piece (13) and the receiving piece (12), and wherein the locking device (10) has a locking bolt (15) which can be passed through the passage (13A) of the stop piece (13) and the passage (14A) of the locking plate (14).

5. Missile launching system (1) according to claim 1, wherein the launch tube wall (80) of the launch tube (8) forms a depression (85) in which the fastening bracket (6) is arranged.

6. Missile launching system (100) for launching missiles from a mobile platform (P), comprising:

a rectangular primary carrier frame (2) extending in a longitudinal direction (L) and having at least one platform coupling structure (3) for releasably fastening the first carrier frame (2) to the mobile platform (P);

a first launch tube receiving device (110) which is fastened laterally to the primary carrier frame (2) and is designed as a closed first frame (111) defining a first receiving opening (112);

a second launch tube receiving device (120) which is fastened laterally to the primary carrier frame (2), is spaced apart from the first launch tube receiving device (110) with respect to the longitudinal direction (L), and is designed as a closed second frame (121) defining a second receiving opening;

a launch tube (8) which has an outer circumference (83) corresponding to the receiving openings (112) of the launch tube receiving devices (110; 120) and which can be inserted in the longitudinal direction (L) into the first and second receiving openings (112); and at least one connecting bolt (130) per launch tube receiving device (110; 120), by means of which the launch tube (8) can be fastened to the launch tube receiving device (110; 120).

7. Missile launching system (100) according to claim 6, wherein the connecting bolts (130) are implemented as screws.

8. Missile launching system (100) according to claim 6, wherein the launch tube receiving devices (110; 120) are each bolted to the primary carrier frame (2).

9. Missile launching system (100) according to claim 6, wherein the launch tube receiving devices (110; 120) each extend in the longitudinal direction (L), and in particular each have a longitudinal extension (l110, l120) which is in a range between 4 percent and 10 percent of a total length (18) of the launch tube (8).

10. Missile launching system (1; 100) according to claim 1, wherein the primary carrier frame (2) comprises:

a first longitudinal beam (21) which extends in the longitudinal direction (L) and on which the at least one platform coupling structure (3) is formed;

a second longitudinal beam (22) extending along the longitudinal direction (L), which is arranged spaced apart from the first longitudinal beam (21) in a vertical direction (H) running transverse to the longitudinal direction (L) and has a first connecting structure (30) on an underside oriented away from the first longitudinal beam (21), wherein the first connecting structure (30) defines a first plug connection portion (31) which extends in the longitudinal direction (L) and to which a second carrier frame (4), which has a second plug connection portion (51) which is complementary to the first plug connection portion (31), can be attached in the vertical direction (H), and has at least two first through-bores (32) spaced apart in the longitudinal direction (L), through each of which bores a connecting device (9) can be passed to fix the primary carrier frame (2) and the second carrier frame (4) to each other when the second carrier frame (4) is fitted to the primary carrier frame (2).

11. Missile launching system (1; 100) according to claim 10, wherein the first plug connection portion (31) is formed by a recess formed on the underside of the second longitudinal beam (22), or by a lug arrangement projecting from the underside of the second longitudinal beam (22) in the vertical direction (H).

12. Missile launching system (1; 100) according to claim 10, additionally having at least two connecting devices and a rectangular second carrier frame which has:

a third longitudinal beam (41) extending in a longitudinal direction (L), which has a second connecting structure (50) on a top side, wherein the second connecting structure (50) defines a second plug connection portion (51) which extends in the longitudinal direction (L) and which is complementary to the first plug connection portion (31), and which can be attached to the first plug connection portion (31) in the vertical direction (H), and at least two second through-bores (52) which are arranged in the longitudinal direction (L) so as to correspond to the first through-bores (32), wherein the connecting devices (9) can each be passed through the first and second through-bores (32; 52) in order to fix the primary carrier frame (2) and the second carrier frame (4) to each other when the second carrier frame (4) is fitted to the primary carrier frame (2).

13. Missile launching system (1; 100) according to claim 12, wherein the second plug connection portion (50) is formed by a lug arrangement projecting from the top side of the third longitudinal beam (41) in the vertical direction (H), or by a recess formed on the top side of the third longitudinal beam (41).

* * * * *